United States Patent
Bruhns

[15] 3,696,792
[45] Oct. 10, 1972

[54] PURPLE MARTIN BIRD HOUSE

[72] Inventor: Robert Bruhns, 72 South Lake Drive, Leesburg, Fla. 32748

[22] Filed: June 21, 1971

[21] Appl. No.: 154,972

[52] U.S. Cl. ................................................. 119/23
[51] Int. Cl. ............................................ A01k 31/00
[58] Field of Search ....................................... 119/23

[56] References Cited

UNITED STATES PATENTS

| 3,367,632 | 2/1968 | Vail | 119/23 X |
| 1,587,804 | 6/1926 | Stein | 119/23 |

OTHER PUBLICATIONS

Dearborn; "Farmers' Bulletin No. 609" 1914, pages 12 & 13

Primary Examiner—Hugh R. Chamblee
Attorney—A. Yates Dowell et al.

[57] ABSTRACT

Apparatus for accommodating a plurality of nests for purple martins in which the apparatus includes a hollow exterior shell fixed to a post and selectively cooperating core telescopically mounted on the post for movement into and out of the shell to facilitate ease of cleaning as well as apparatus which can be shipped in multiple independent parts and quickly assembled as an integral unit.

8 Claims, 18 Drawing Figures

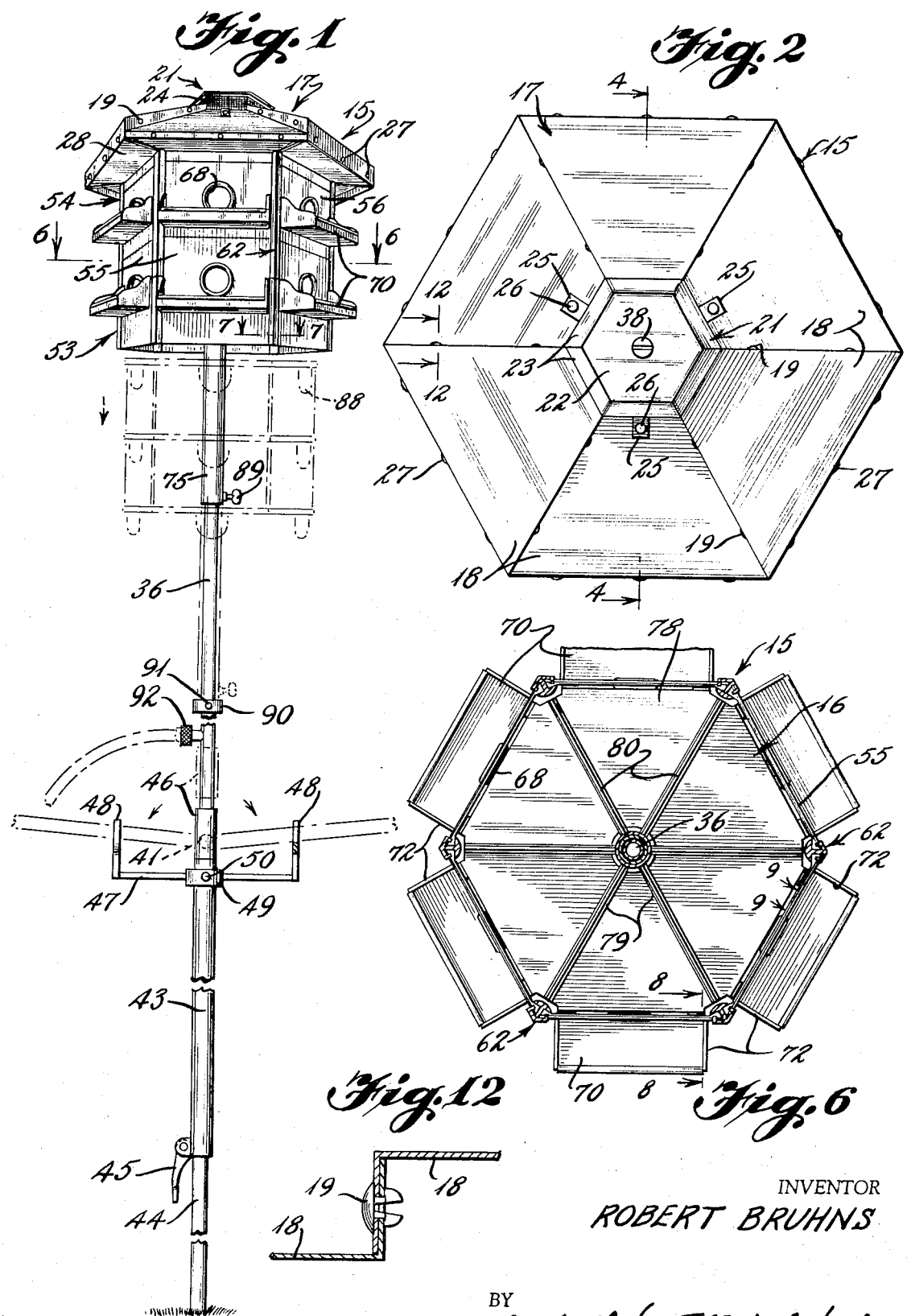

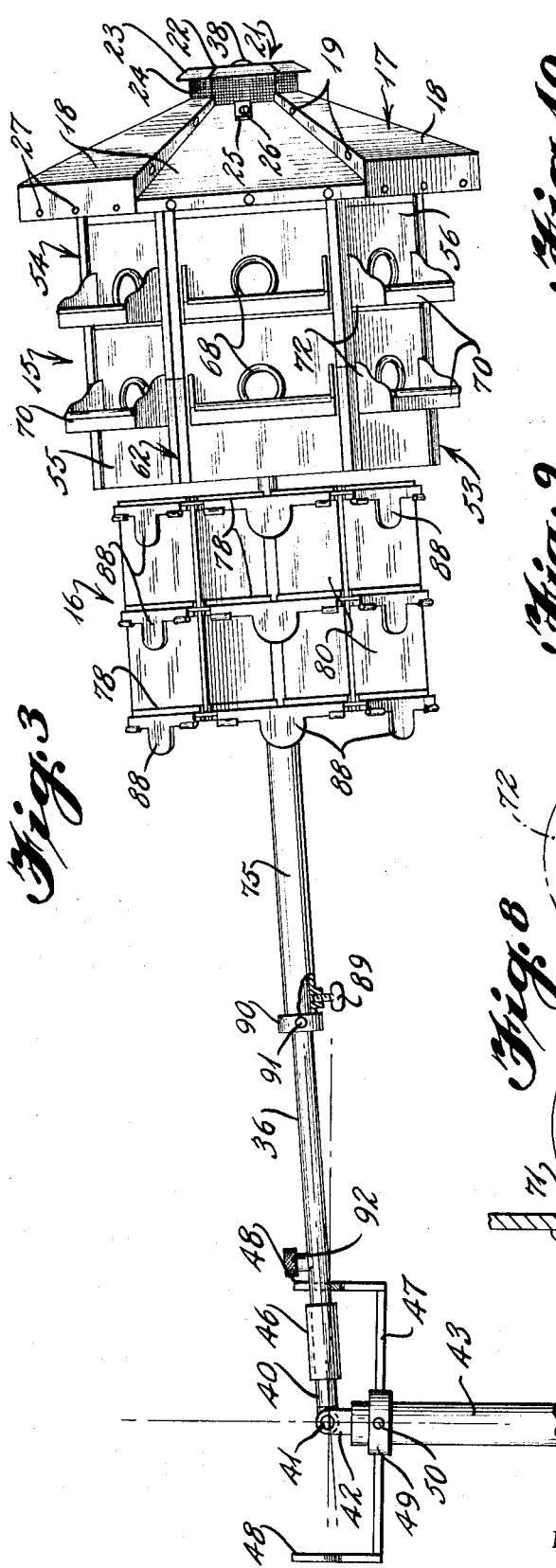
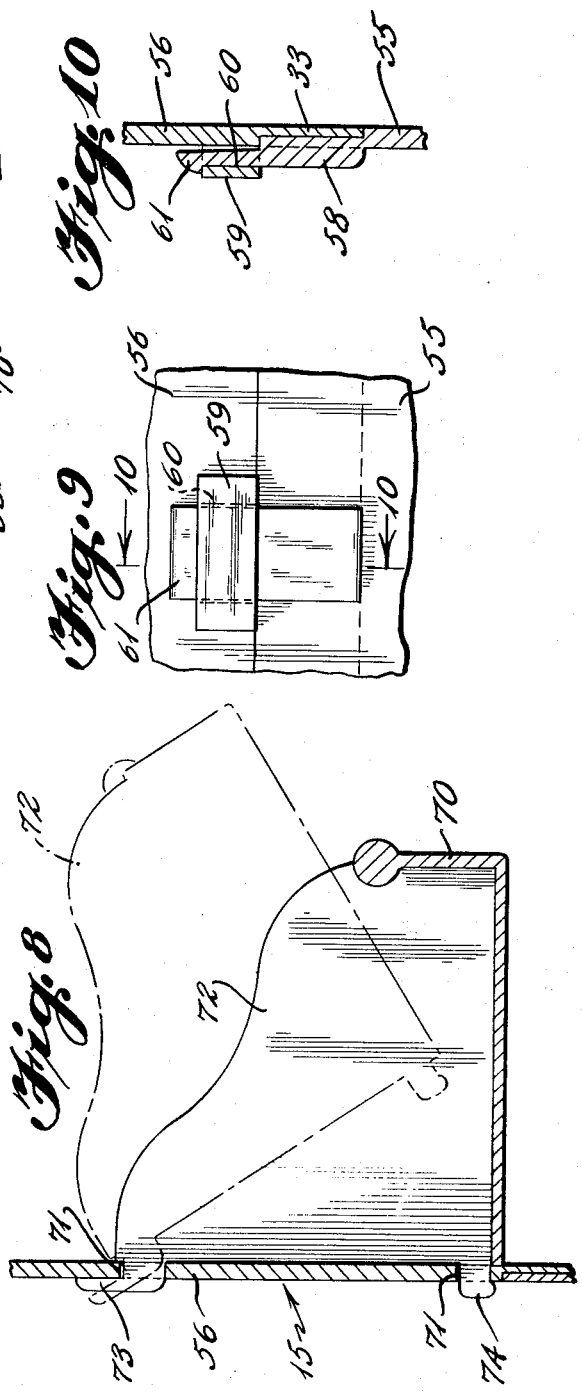
INVENTOR
ROBERT BRUHNS

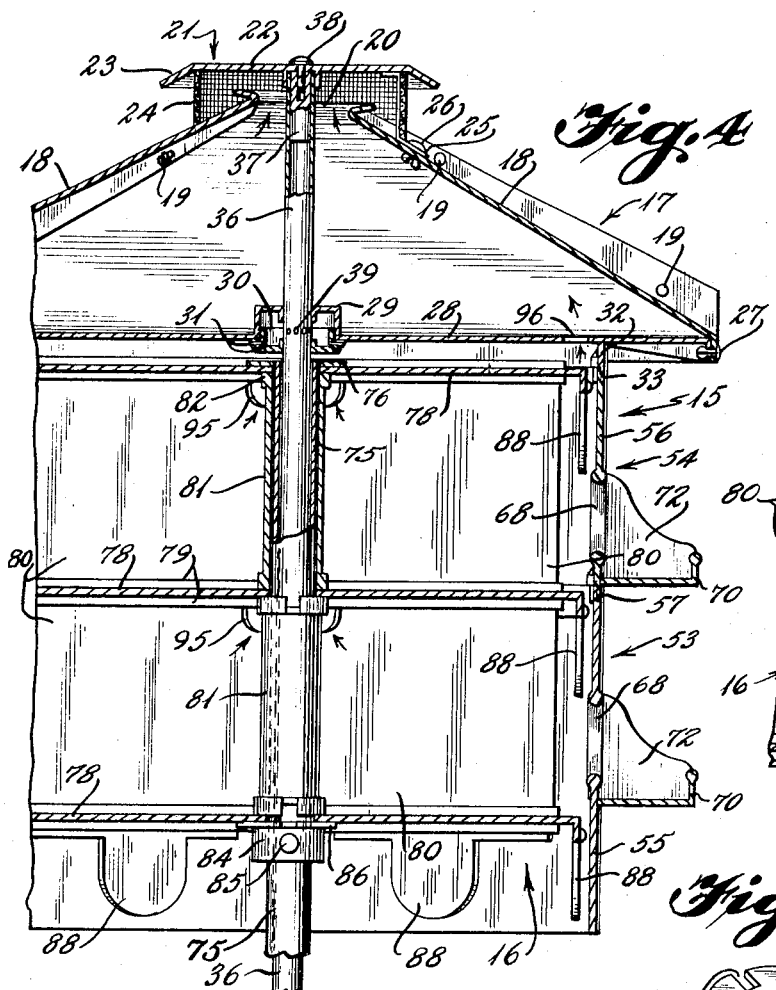
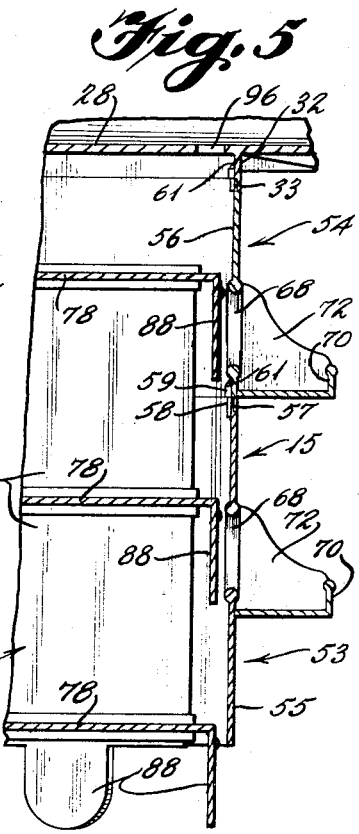
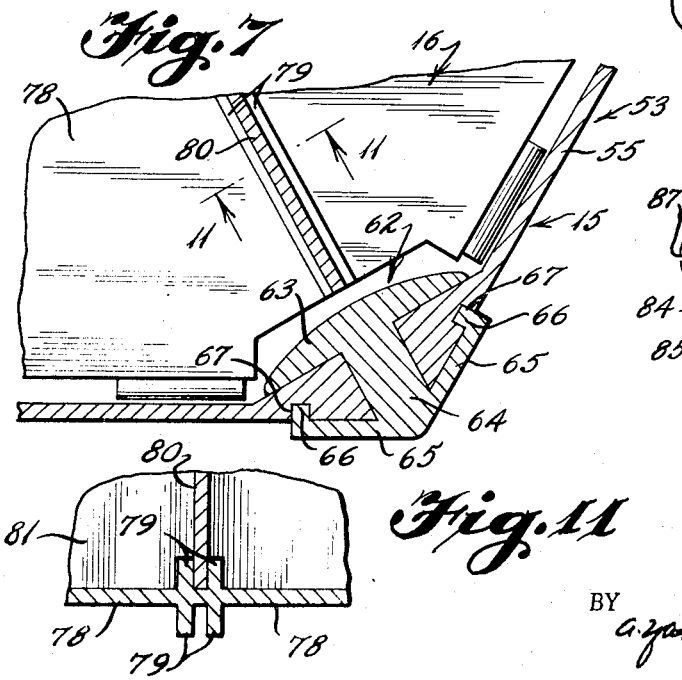
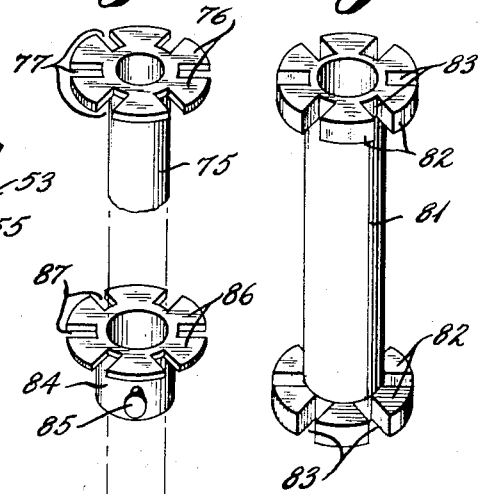
INVENTOR
ROBERT BRUHNS

PATENTED OCT 10 1972 3,696,792

INVENTOR
ROBERT BRUHNS

BY
ATTORNEYS 3,696,792

PURPLE MARTIN BIRD HOUSE

BACKGROUND OF THE INVENTION

1. Field of the Invention

This invention relates generally to bird houses of various kinds and relates specifically to bird houses for purple martins having means to facilitate the cleaning of the bird house.

2. Description of the Prior Art

Heretofore many efforts have been made to provide bird houses for various types of birds including purple martins in which some means has been provided for cleaning the houses after the young have been reared and have left the nest, and some of these devices have been mounted on relatively tall posts to reduce the possibility of predators attacking the birds. As an example, Farmers Bulletin 609, published by the U.S. Department of Agriculture in 1914, discloses a plurality of bird houses including martin houses and how to build them. In this Bulletin the martin house is mounted on a post with the roof structure fixed to the top of the post while the main body of the house is telescopically mounted so that the house can be lowered for cleaning. This structure also includes automatically operated doors covering the openings to the house when martins are not present to exclude most other birds and prevent them from using the martin house.

Purple martins have proved very beneficial to the health and comfort of humans since their main diet consists of mosquitoes and other insects that bite people and cause itching discomfort as well as carry diseases such as malaria, yellow fever, and the like. A single purple martin can devour as many as 2,000 mosquitoes and other insects a day and therefore they are much desired in areas where mosquitoes are prevalent. However, purple martins are very selective as to their living quarters since they have a social instinct and like apartment dwelling. This instinct is conspicuously lacking in most other birds. Also purple martins will not nest in apartments which are not scrupulously clean, nor will they nest in apartments which other birds such as sparrows, starlings, or the like.

SUMMARY OF THE INVENTION

The present invention is a purple martin bird house having a plurality of separate compartments and including a hollow shell with a roof and exterior side members mounted on a tubular post and having a central core telescopically carried by the post. The core includes a plurality of separate apartments and may include one or more levels or stories. Both the shell and the core may be added to other shells and cores to provide a multi-story structure. The core is separable from the shell to facilitate cleaning as well as to prevent the use of the bird house by other birds until purple martins arrive in the neighborhood.

Also apparatus is provided for introducing water into the bird house to soften substances which cause the floor to adhere to the shell, such as deposits left by the bird, egg shells and other material.

It is an object of the invention to provide a purple martin bird house in which the core is separable from the outer shell and is mounted on a generally tubular pipe so that the core can be freely rotated by a spray of water under pressure from a garden hose to clean the individual apartments.

Another object is to provide a multi-story purple martin bird house with a fixed shell and a telescopically mounted core and includes means for introducing water under pressure into the bird house before the parts are separated to dissolve any substances causing the parts to adhere together.

Another object is to provide a purple martin bird house in kit form which can be disassembled for storage and shipping and can readily be reassembled in a minimum of time and to which additional levels or stories may be added at a later date.

BRIEF DESCRIPTION OF THE DRAWINGS

FIG. 1 is a perspective illustrating one application of the invention.

FIG. 2 is an enlarged top plan view thereof.

FIG. 3 is a side elevation illustrating the bird house in cleaning position.

FIG. 4 is an enlarged fragmentary section on the line 4—4 of FIG. 2 showing the core in position of use.

FIG. 5 is a fragmentary section similar to FIG. 4 and showing the shell with the core in position to block the openings in the shell.

FIG. 6 is an enlarged section on the line 6—6 of FIG. 1.

FIG. 7 is an enlarged fragmentary section on the line 7—7 of FIG. 1.

FIG. 8 is an enlarged fragmentary section on the line 8—8 of FIG. 6.

FIG. 9 is an enlarged fragmentary section on the line 9—9 of FIG. 6.

FIG. 10 is a section on the line 10—10 of FIG. 9.

FIG. 11 is a section on the line 11—11 of FIG. 7.

FIG. 12 is an enlarged section on the line 12—12 of FIG. 2.

FIG. 13 is a perspective of an elongated core mounting sleeve.

FIG. 14 is a perspective of a floor spacer sleeve.

DESCRIPTION OF THE PREFERRED EMBODIMENTS

Figure 15:
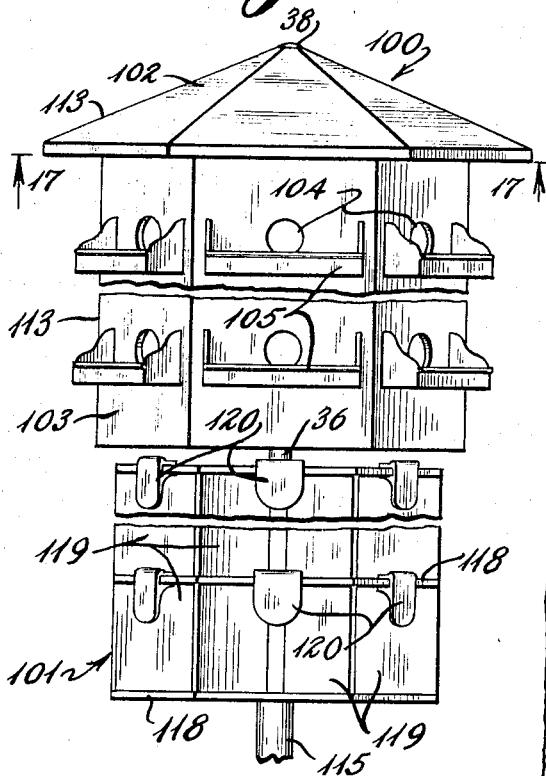
FIG. 15 is a side elevation of another embodiment of the invention.

With continued reference to the drawings, the purple martin bird house includes an outer shell 15 and an inner core 16 mounted in such a manner that the inner core is movable relative to the shell. As illustrated in FIGS. 1–14, the shell 15 includes a roof structure 17 having a plurality of generally triangular panels 18 connected together in any desired manner, as by overlapping flanges secured in water-resistant relationship to each other by fasteners 19. The upper portion of each of the panels is bent back upon itself to define a central opening 20 to permit air to escape from under the roof structure 17 as well as to prevent rain from entering the opening 20.

A ventilator 21 is mounted on the roof structure and includes a flat roof 22 with a downwardly inclined peripheral edge 23. A perforated plate or screen 24 is connected to the bottom of the flat roof 22 and extends downwardly into engagement with the roof panels 18. The screen 24 has a plurality of tabs 25 connected to the panels 18 by fasteners 26.

The lower extremities of the panels 18 are connected by fasteners 27 to the periphery of a floor or platform 28. Such platform includes a central upwardly extending well 29 in the lower end of which is mounted a distributor 30. The well 29 and the distributor 30 define a header into which water under pressure can be introduced when desired and the distributor has a plurality of openings 31 through which water is discharged. Spaced inwardly from the edge of the floor 28 is a downwardly extending flange 32 having a reduced downwardly extending offset portion 33 adapted to cooperate with the structure of the shell 15 in a manner to be described later.

In order to support the roof structure 17, an elongated hollow pipe 36 is provided with a plug 37 at one end which receives a fastener 38 extending through the flat roof 22 to connect the roof to the pipe. As illustrated in FIG. 4, the pipe 36 extends through the header defined by the well 29 and the distributor 30 and has a plurality of openings 39 located within such header. The opening 39 provide communication between the interior of the pipe and such header. Preferably the well 29 and the distributor 30 are sealed to the pipe 36 in any desired manner to prevent leakage through the connection, as well as to add support for the roof structure 17.

The lower end of the pipe 36 is sealed by a plug 40 and one end of such plug is connected by pivot 41 to a yoke 42 mounted on one end of a sleeve 43. The sleeve 43 is telescopically mounted on a post 44 imbedded in the ground, as illustrated in FIG. 1, to raise the bird house a substantial distance above the earth. In order to adjust the position of the sleeve 43 relative to the post 44, a cam type lock 45 is mounted on the lower end of the sleeve 43 and adapted to engage the post 44 in one position, but can be rotated out of engagement to permit relative movement between the sleeve and the post.

To retain the pipe 36 in an upright position about the pivot 41, a lock sleeve 46 is slidably mounted on the pipe 36 and is adapted to overlie the pivot 41 and engage the yoke 42 when the pipe is in an upright position. At times it is desirable to tilt the pipe 36 to a generally horizontal position, as illustrated in FIG. 3, to facilitate cleaning of the bird house, and this can be done by merely raising the lock sleeve 46 above the pivot 41 so that the pipe can be swung to either side. It is desirable to limit the swinging movement of the pipe to to a movement of less than 90° for a purpose which will be described later. In order to do this, a yoke 47 having a pipe receiving cradle 48 at each end is fixed to a collar 49 normally held in fixed position on the sleeve 43 by a set screw 50.

The outer shell 15 includes a lower level or story 53 and if desired one or more intermediate levels or stories 54. When the bird house is to include a single story, the lower story 53 will be provided. However, if the bird house is to include multiple stories, the lower level 53 and one or more intermediate levels 54 will be provided.

As illustrated, each of the lower and intermediate stories 53 and 54 includes a plurality of side panels 55 and 56, respectively, with the side panels 55 being longer than the panels 56. The lower portion of the intermediate panels 56 includes an offset portion 57 and the upper portion of each of the side panels 55 and 56 includes an offset portion 58 adapted to cooperatively engage the offset portion 33 of the roof structure or the offset portion 57 of an intermediate panel.

In order to lock the panels together in a vertical direction, the downwardly extending flange 32 of the roof structure and the lower portion of each of the intermediate panels 56 includes one or more bosses 59 having an opening 60 extending therethrough in a vertical direction, as illustrated in FIGS. 9 and 10. The upper portion of each of the lower and intermediate panels has an upwardly extending latch member 61 adapted to extend through the openings 60 and engage the top of the bosses 59 to lock the panels in a vertical direction.

The side panels 55 and 56 of each story are adapted to be locked together at their edges so that they cannot accidentally come apart. As illustrated in FIG. 7, this is done by providing an extruded locking strip 62 having a base portion 63 integrally connected to one end of a web portion 64 and the opposite end of the web portion is integrally connected to a pair of angularly disposed legs 65 each of which has an inwardly extending flange 66 received within a slot or groove 67 in each of the side panels 55 or 56. This construction locks the side edges of the panels 55 and 56 between the base portion 63 and the legs 65 of the locking strip.

Normally the locking strip 62 is of a length corresponding generally to the length of the intermediate side panels 56; however, to accommodate the longer side panels 55 of the lower story, certain of the locking strips should be of a length slightly longer than the side panels 55 so that they will extend the full length of said side panels as well as the width of the downwardly extending flange 32. When the bird house contains more than one story, the longer locking strips 62 should be applied to the upper story so that it will extend downwardly and engage the next lower story so that abutting stories will be locked together by the strips 62 as well as the latch members 61.

Each of the side panels 55 and 56 includes an opening 68 of a size to accommodate a purple martin to permit ingress and egress through the panels. As illustrated in FIG. 8, a perch or platform 70 is provided for each of the openings 68. To facilitate cleaning, each perch is removably mounted. As illustrated in FIG. 8, this is done by providing a pair of slots 71 on each side of the opening 68 in each side panel and providing the sides 72 of each of the platforms 70 with a pair of lugs 73 and 74. The upper lug 73 extends through the upper slot 71 and is located behind the corresponding panel, while the lower lug 74 snaps through the lower slot so that the platform can be easily removed, as illustrated in phantom in FIG. 8, by swinging such platform around the upper lug 73.

The inner core 16 is telescopically received within the shell 15 and has a separate compartment in alignment with each of the openings 68. In order to mount the inner core upon the pipe 36 for telescopic movement into and out of the outer shell 15, an elongated sleeve 75 is provided which is slidably mounted on the pipe 36. An outwardly extending flange 76 is welded or otherwise attached to the upper end of the sleeve 75 and such flange includes a plurality of radial notches 77. A plurality of equally spaced floors or platforms 78 are mounted on the elongated sleeve 75 and each of such floors includes a plurality of radially disposed upwardly and downwardly extending spaced partition support members 79 adapted to receive partitions 80 therebetween for dividing the space between the floors 78 into multiple compartments. A spacer sleeve 81 of a predetermined length is located between the floors 73 and such sleeves are slidably mounted on the elongated sleeve 75. Each of the spacer sleeves 81 includes an outwardly extending flange 82 at each end and each flange includes a plurality of notches 83 adapted to receive the partition support members of the floors 78.

When a desired number of platforms 78 and partitions 80 have been assembled on the elongated sleeve 75 with the uppermost floor 78 in engagement with the flange 76, a locking collar 84 is mounted along the sleeve 75 and secured thereto by a set screw 85. The locking collar 84 preferably has an outwardly extending flange 86 for engaging the bottom surface of the floor 78 and such flange has a plurality of notches 87 for engaging the lowermost partition support member 79. In this manner the floors 78 and partitions 80 are locked together in assembled relation.

As illustrated in FIGS. 4 and 5, each of the floors 78 is provided with a plurality of depending flanges 88 of a size to cover the openings 68 in the side panels 55 and 56 when the core is lowered slightly to prevent unwanted birds such as sparrows, starlings and the like from nesting in the bird house when the purple martins are not in the area.

In order to raise and lower the inner core 16 relative to the outer shell 15 and to lock the core in adjusted position, the lower end of the elongated sleeve 75 is provided with a set screw 89 adapted to engage the pipe 36 to secure the elongated sleeve 75 in fixed position. A stop collar 90 is mounted on the pipe 36 in any desired manner, as by a set screw 91, and such stop collar is spaced below the elongated sleeve 75 a distance sufficient to permit the inner core 16 to be entirely withdrawn from the outer shell 15.

Adjacent to the pivot 41, the pipe 36 has a hose connection 92 adapted to receive one end of a garden hose so that water under pressure can be introduced into the pipe 36 when desired.

To improve the circulation of air throughout the bird house, the partitions 80 are provided with one or more openings 95 and the floor 28 of the roof structure 17 is provided with a plurality of openings 96 so that air entering the openings 68 facing the direction of the wind can circulate throughout the compartments and can be exhausted through the openings 20 and the ventilator 21 at the top of the roof without causing drafts on the nesting birds.

The side panels 55 and 56 have been illustrated and described as being constructed from a plurality of separate parts joined together; however, it is contemplated that a single panel covering several stories or levels could be provided with such panels having a plurality of openings 68 to permit ingress and egress to the various compartments. Also it is contemplated that, if desired, when the various parts are connected together, an adhesive or other bonding agent could be applied so that the parts will be permanently connected to form a more rigid structure.

Figure 16:
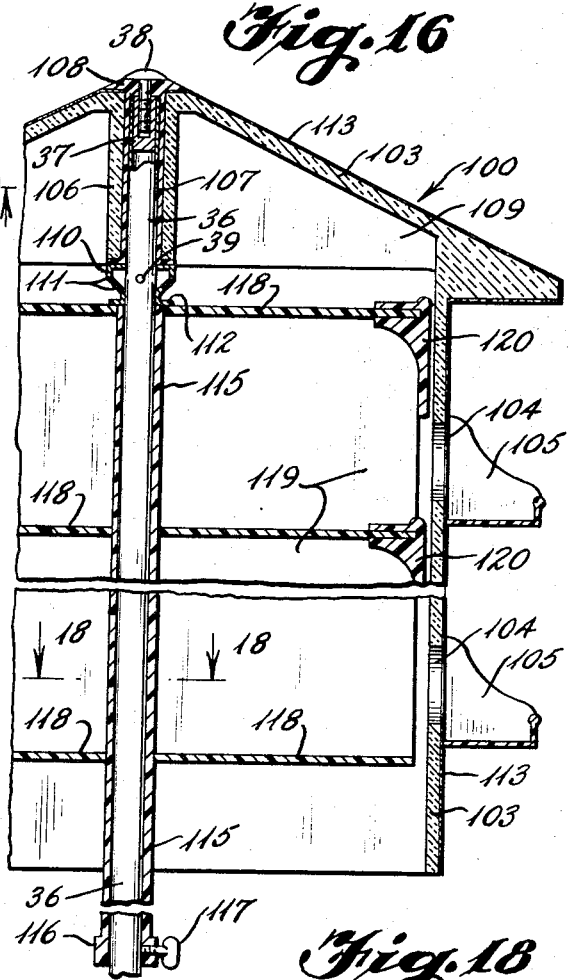
FIG. 16 is an enlarged fragmentary section of the structure of FIG. 15.
Figure 17:
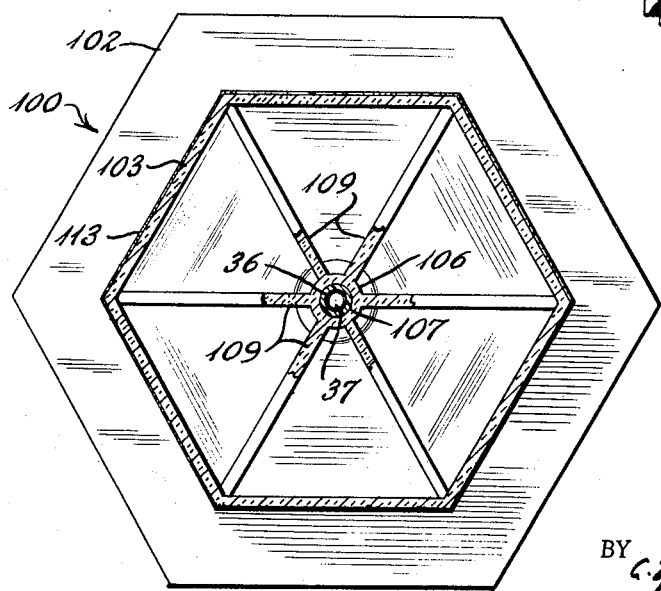
FIG. 17 is an enlarged section on the line 17—17 of FIG. 15.
Figure 18:
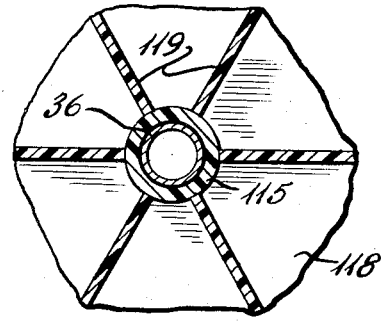
FIG. 18 is an enlarged section on the line 18—18 of FIG. 16.

With reference to FIGS. 15–18, a modified form of the invention is provided including an outer shell 100 which telescopically receives an inner core 101. The shell 100 preferably is molded as a one-piece unit of foamable thermal insulating material such as polystyrene, urethane, phenolic, silicone or the like. In this structure a roof 102 and angularly disposed side walls 103 are molded as an integral unit. Openings 104 in the side walls, which permit ingress and egress of the purple martins, may be formed at the time the shell is molded, or may be cut in a later operation. A perch or platform 105 similar to the perch 70 may be provided for each of the openings 104, and such perch may be adhered to the side walls 103 or may be attached thereto in any other desired manner, as by tabs (not shown) received within slots in the side walls.

Within the interior of the roof 102, a downwardly extending tubular extension 106 is provided having a bore which receives an inner sleeve 107 with a cap 108. As illustrated best in FIG. 17, the tubular extension is supported by ribs 109 forming part of the roof 102. A distributor 110 having openings 111 is welded or otherwise fixed to the pipe 36 in a position to engage and support the lower portion of the tubular extension 106 with the openings 39 of the pipe located within the distributor 110. The upper end of the pipe 36 extends through the inner sleeve 107 and is connected to the roof 102 by the fastener 38. The lower portion of the distributor 110 is provided with an outwardly extending flange or stop 112 to limit upward movement of the core 101.

The roof 102 and side walls 103 may be provided with a protective coating 113 of paint or sheet material bonded or otherwise attached to the outer shell to provide a tough decorative skin therefor. Such skin may be applied only to the outer surfaces, or may be applied to both outer and inner surfaces of the shell 100.

The inner core 101 includes an elongated sleeve 115 slidably mounted on the pipe 36 and such sleeve can be made of any desired material, including metal, or one of the plastic polymers or copolymers. The lower end of the sleeve 115 is provided with an enlargement 116 for the reception of a thumb screw or other fastener 117 by means of which the sleeve 115 is secured in fixed adjusted position, or is freely movable along and around the pipe 36 when the fastener is loosened. Adjacent to the upper end of the sleeve 115, a plurality of platforms 118 are bonded or otherwise secured to the sleeve in spaced relation to each other. The outer periphery of each of the platforms 118 is complementary to and spaced slightly from the interior surface of the outer shell 100 so that the inner core can be telescopically received therein. A plurality of partitions 119 divide the space between adjacent platforms into a plurality of compartments with each compartment adapted to accommodate a purple martin family. The partitions are bonded or otherwise attached to the platforms 118 as well as the elongated sleeve 115. Each of the partitions 119 may, if desired, have one or more openings (not shown) adjacent its upper edge to increase ventilation of the compartments.

In order to prevent unwanted birds from occupying the bird house when purple martins are not in the area, each of the platforms 118 is provided with a plurality of doors or depending flanges 120 with one of the doors disposed in alignment with each of the openings 104 of the outer shell. The doors 120 may be formed as an integral part of the platforms 118, or as illustrated may be formed as a separate part and attached to the platforms in the appropriate position. When purple martins are not in the area, the inner core 101 is lowered slightly so that the doors 120 block the openings 104 and prevent other birds from gaining entrance into the bird house.

In the operation of the device, during the winter and early spring the inner core 16 or 101 is lowered slightly relative to the outer shell 15 or 100, respectively, so that the flanges 88 or 120 on the platforms 78 or 118 will cover the openings 68 or 104 and the house will remain unoccupied. When purple martins appear in the neighborhood, the set screws 89 or 117 is released and the elongated sleeve 75 or 115 is moved upwardly so that the inner core is fully inserted within the shell and the purple martins can enter the openings 68 or 104. When the purple martins leave in the fall, it is necessary to clean the bird house so that the martins will use the house when they return. In order to do this, the cam type lock 45 is released so that the sleeve 43 can be lowered on the post 44. Since bird deposits, as well as egg shells and materials used in the makings of the nest, may be causing the inner shell to adhere to the outer shell, a garden hose is attached to the hose connection 92 and water is introduced into the pipe 36 and is directed upwardly through the openings 39 into the distributor 30 or 110. From the distributor the water will flow through the openings 31 or 111 onto the uppermost platform 78 or 118 of the core where it will flow outwardly and down the inner surfaces of the outer shell to soften the material bonding the outer shell and core together. The set screw 89 or 117 then is released and the elongated sleeve 75 or 115 is lowered until it engages the stop collar 90. Thereafter the lock sleeve 46 is raised from the pivot 41 and the pipe 36 is swung to one side where it is received within the cradle 48.

In this position the individual compartments are easily accessible for removing all of the nests and other residue either by hand or by directing a stream of water under pressure from a garden hose onto the inner core. Since the elongated sleeve 75 or 115 is freely rotatably mounted on the pipe 36, all of the material can be removed from the individual compartments in a minimum of time and with minimum effort. Also, due to the slightly upwardly inclined pipe 36, rotation of the core about such pipe will not tend to move the core into the shell. This is particularly true when the core is being rotated by a stream of water under pressure. After the compartments have been cleaned and treated with insecticides, such as sulphur or the like, to kill parasites, the core again can be inserted partly into the shell so that the platform flanges 88 or 120 block the openings 68 or 104.

I claim:

1. A bird house for purple martins comprising post means adapted to have one end imbedded within the earth, a hollow outer shell including a roof structure fixed to the opposite end of said post means, said shell including a plurality of angularly disposed sides, each of said sides having at least one opening of a size to permit purple martins to pass therethrough, an elongated sleeve slidably and rotatably mounted on said post means, an inner core carried by said elongated sleeve, said inner core including at least two spaced generally parallel floors, a plurality of partitions located between said floors, said floors and said partitions defining a plurality of compartments, each of said compartments being alignable with one of the openings in the sides of said outer shell, said inner core being telescopically received within said shell, means on each of said floors located adjacent to said shell and adapted to block the openings in said shell when the core is in one position and to provide free access through said openings when the core is in a second position, and means on said post means to limit downward movement of said elongated sleeve and said inner core when the inner core is located exteriorly of said outer shell, so that the inner core may be freely rotated about said post means for cleaning said compartments.

2. The structure of claim 1 in which at least a portion of said post means is hollow, means for connecting a source of water under pressure to said hollow portion, said outer shell including distributor means located above said inner core, means providing communication between the hollow portion of said post means and said distributor means, said distributor means having a plurality of openings for discharging water onto said inner core so that the water will flow between the inner core and the outer shell.

3. The structure of claim 2 in which said post means includes pivot means permitting a portion of said post means to swing relative to the other portion.

4. The structure of claim 1 including spacer sleeves mounted on said elongated sleeve and adapted to engage the floors of said inner core.

5. A bird house for purple martins comprising a post, a sleeve telescopically mounted on said post, means for locking said sleeve in adjusted position relative to said post, a pipe pivotally connected at one end to said sleeve, a hollow outer shell fixed to the opposite end of said pipe, said shell including a plurality of angularly disposed sides, each of said sides having at least one opening to permit purple martins to pass therethrough an inner core telescopically mounted on said pipe, said inner core including at least two spaced generally parallel floors, a plurality of partitions located between said floors, said floors and said partitions defining a plurality of compartments, each of said compartments being alignable with one of the openings in the sides of said outer shell, distributor means carried by said shell above said inner core, means for connecting a source of water under pressure to said pipe, means providing communication between said pipe and said distributor means, said distributor means having openings for discharging water onto said inner core, and means on said post for supporting said pipe when the pipe is swung to a generally horizontal position so that the inner core may be freely rotated about said pipe for cleaning said compartments.

6. The structure of claim 5 in which said shell includes a plurality of panels adapted to be connected together in assembled relation.

7. The structure of claim 5 in which said shell is molded in one piece of foamable thermal insulating material.

8. The structure of claim 5 including means for circulating air within said bird house.

* * * * *